June 11, 1957 M. B. FINKELSTEIN ET AL 2,795,717

CATHODE RAY BEAM CENTERING APPARATUS

Filed Aug. 1, 1955

INVENTORS
MORRIS B. FINKELSTEIN
AND BURTON R. CLAY
BY [signature]
ATTORNEY

United States Patent Office 2,795,717

Patented June 11, 1957

2,795,717

CATHODE RAY BEAM CENTERING APPARATUS

Morris B. Finkelstein, Collingswood, and Burton R. Clay, Woodbury, N. J., assignors to Radio Corporation of America, a corporation of Delaware Application August 1, 1955, Serial No. 525,651

7 Claims. (Cl. 313—76)

The present invention relates to improvements in electron beam centering apparatus for cathode ray beam devices such as kinescopes, iconoscopes, vidicons and the like.

In cathode ray beam devices intended to be used in conjunction with electromagnetic beam deflection systems, it is desirable to provide some means for centering of the electron beam on a target structure. In the cathode ray beam kinescopes used for television picture reproduction in home television receivers, the electron beam is simultaneously deflected in horizontal and vertical directions, so as to define a rectangular television picture raster. This is generally accomplished through the use of an electromagnetic deflection yoke which is positioned around the neck of the kinescope and contains vertical and horizontal deflection windings which are excited from respectively separate sources of vertical and horizontal deflection waves. Frequently, the deflection yoke windings are connected with a deflection output stage which produces a residual direct current flow through the deflection winding. This direct current flow, in turn, produces a substantially steady magnetic field which tends to shift the electron beam away from a normal center position on the kinescope target. This results in de-centering of the television image.

This problem is particularly acute in electromagnetic deflection circuits of the direct coupled variety in which the total output current of the deflection signal power output stage is caused to pass through the deflection windings. In transistor deflection circuits, for example, it is most expedient that the deflection winding be connected in direct current relation to the emitter-collector output path of the transistor. In such cases, the de-centering effect of the static emitter-collector current flow is generally of a magnitude which will produce serious de-centering of the television raster thereby requiring substantial correction in order to usefully reposition the television raster to a central area on the kinescope target.

Although various permanent magnet devices for cathode ray beam positioning have been disclosed in the prior art, experience has shown that with prior art permanent magnet arrangements, undesirable distortion of the television raster results if too much beam centering correction is attempted. Moreover, in carrying out beam centering control in kinescopes of the color variety, it has been found that unless the beam centering device is imposed on the electron stream within the kinescope at the deflection center of the deflection yoke a defocusing effect of the cathode ray electron stream is produced as the beam is deflected thereby resulting in what appears to be convergence difficulties and a degradation in the color purity throughout the reproduced color image.

It is, therefore, an object of the present invention to provide improved beam centering for cathode ray devices.

It is further an object of the present invention to provide an improved beam centering apparatus for cathode ray beam devices intended for use with electromagnetic deflection systems and especially such devices in which the centering control is desirably imposed at the deflection center of the electromagnetic deflection yoke.

In carrying out the present invention in one of its more general forms, a first and a second magnetized ring member are positioned immediately adjacent one another inside the cylindrical opening of an electromagnetic deflection yoke. The permeability of the ring members is made substantially equal to unity while a tubular core member of high permeability is caused to surround and embrace the rings and deflection coil windings. The material comprising the rings is also selected to have a high magnetic coercivity and retentivity whereby each ring may be and is permanently magnetized such that opposite magnetic poles lie at opposite extremities of a given ring diameter. The cylindrical opening of the yoke is dimensioned to snugly hold said rings in position relative to one another yet permit contra-rotation of the rings for adjusting the magnitude of net flux provided by the rings acting as a combination. The central openings in the rings are so dimensioned as to freely receive the neck of a cathode ray beam device such as a kinescope. By adjusting the magnitude of net flux produced by the rings in combination and orienting the ring combination properly around the neck, an effective control of beam position is provided without interfering with beam deflection produced by the deflection yoke.

A better understanding of the present invention as well as other of its objects and features of advantage may readily be seen in reading the specification especially when taken in conjunction with the accompanying drawings in which.

Figure 1:
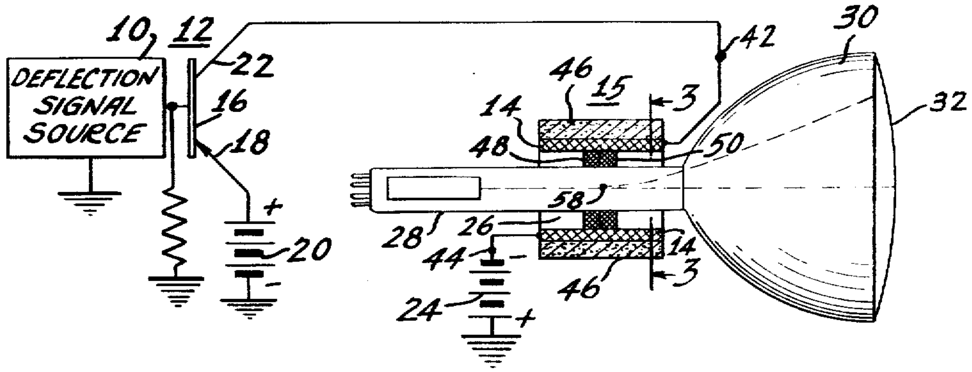
Fig. 1 is a combination block and schematic representation of a transistor type electromagnetic deflection system for cathode ray beam kinescopes.

Turning now to Fig. 1, there is shown at 10 a source of deflection signal suitable for driving the transistor amplifier device 12 to produce a desirable deflection waveform through a winding 14 in the deflection yoke 15. For illustrational simplicity, only the vertical deflection windings of the yoke have been illustrated. The base 16 of the transistor 12 is directly driven by the deflection signal source 10 while the emitter 18 is connected with circuit ground through a source of forward biasing potential 20. The collector 22 is connected with one terminal of the deflection yoke winding while the other terminal of the winding is connected through a source 24 of collector biasing potential. The deflection yoke 15 is provided with a central cylindrical opening 26 adapted to freely surround the neck 28 of a cathode ray beam device such as the kinescope 30.

Figure 3:
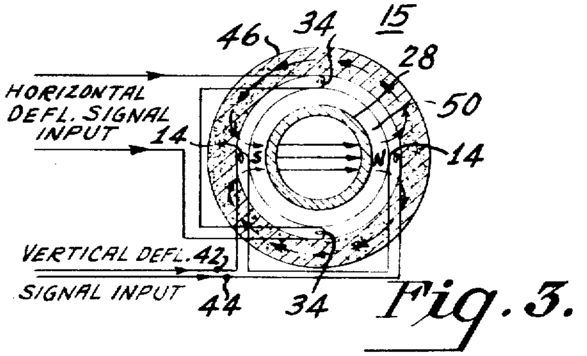
Fig. 3 is a combination diagrammatic and schematic cross-sectional representation of the electromagnetic deflection yoke and shown in Fig. 1 on line 3—3 employing the present invention.
Figure 2:
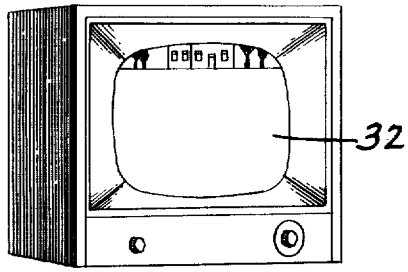
Fig. 2 is a perspective view of a television receiver illustrating the undesirable result of beam de-centering which the present invention overcomes.

Without the practice of the present invention and ignoring rings 48 and 50 later to be described, the arrangement of Fig. 1 would cause a net de-centering of the electron beam in the absence of deflection signal. Assuming that the cathode ray beam of the kinescope 30 is properly modulated by a video signal (such means being well known and not, therefore, shown) and the deflection yoke 15 properly driven by deflection signals of both the television horizontal and vertical types to define a luminous television raster on the screen 32 of the kinescope, the resulting television picture would be de-centered as illustrated in Fig. 2. This de-centering can be attributed to the static (i. e., direct current) emitter-collector current flow through the transistor 12 in the absence of deflection signal. In Fig. 1 it is assumed that the horizontal windings of the deflection yoke 15 are excited by a horizontal deflection signal having no direct current component. Horizontal and vertical windings for the deflection yoke 15 are indicated in Fig. 3. Here the horizontal deflection windings are shown at positions 34, with vertical deflection windings at positions 14. The horizontal deflection coils or windings 34 are connected in series aiding as are the vertical deflection windings 14. For convenience, terminals 42 and 44 of the vertical deflection winding shown in Fig. 1 have been indicated in Fig. 3. The deflection yoke 15 may be quite conventional in nature and by way of example has been shown with a magnetic core member 46 surrounding the windings 14 and 34. Core 46 may be comprised of a tubular member of ferrous material having a high magnetic permeability preferably of a value falling in the range of two to three hundred. Yoke 15 in Fig. 3 is shown to have a cylindrical opening, aforementioned, which will freely embrace the neck 28 of the kinescope 30 with substantial clearance as shown in Fig. 1.

Figure 4:
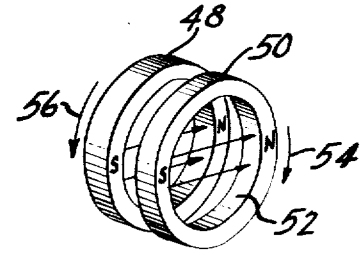
Fig. 4 is a diagrammatic representation of the magnetized ring elements.

In accordance with the present invention, the beam de-centering effects produced by the static current flow through the vertical deflection winding is overcome through the use of two ferromagnetic ring magnet members 48 and 50 shown in Fig. 1. Since Fig. 3 is a cross-sectional view of the yoke arrangement of Fig. 1 taken on the line 3—3 only ring 50 is visible. The rings 48 and 50 are shown in more detail in Fig. 4. Each ring is provided with a central opening such as 52 having a diameter sufficiently large to freely accept the neck 28 of the kinescope 30. The outer dimension of each ring is such as to snugly fit within the opening 26 of the yoke 15 yet permit sliding of the ring members 48 and 50 along the neck 28 at the same time permitting contra-rotation of the rings 48 and 50 with respect to one another. In a preferred form of the present invention, the rings 48 and 50 are made of comminuted powdered barium ferrite or equivalent and have a magnetic permeability substantially equal to unity which, in turn, corresponds to the magnetic permeability of air. In this way, the presence of the rings 48 and 50 within the deflection yoke 15 will not in any way affect the distribution of the magnetic flux required for beam deflection. However, the barium ferrite material of which the rings 48 and 50 are made is so compounded and formed as to provide a magnetically susceptible material having a high magnetic coercivity and retentivity such that the rings may be permanently magnetized across their diameter as shown in Fig. 4. When magnetized, as shown, opposite polarity states will exist at the opposite extremities of a diameter. The north and south pole designations shown in Fig. 4 illustrate the preferred mode of magnetization. This will produce a flux flow transverse to the neck of a cathode ray beam device when the rings 48 and 50 are positioned about its neck as shown in Fig. 1. Since the magnetic permeability of the core 46 in the deflection yoke is significantly greater than the permeability of the material comprising the rings 48 and 50, the flux distribution produced by the permanent magnetism in the rings will be significantly influenced by the core 46. If the magnetic reluctance of the paths between the outer extremities of the rings 48 and 50 to the inner extremity of the core 46 is greatly less than the reluctance of the air path across the diameter of the rings 48 and 50, a high flux concentration will be developed across the diameter of the rings. Moreover, if the core 46 is in close proximity to the rings 48 and 50, the flux produced by the rings 48 and 50 will be confined to substantially that portion of the tube neck embraced by the rings. This will tend to localize the influence of the permanent magnetic flux produced by the rings thereby imposing a highly desirable beam centering action on the cathode ray beam within the kinescope 30. In practice, the separation between the yoke core 46 and the outer periphery of the rings 48 and 50 may be as small as ⅛ of an inch whereas the diameter of the central opening in the rings may be as great as 3 inches in the case of the present day tri-color kinescopes used in the reproduction of color television pictures.

Figure 5:
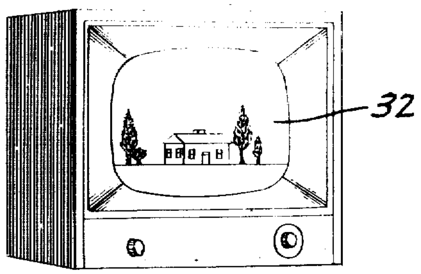
Fig. 5 is a perspective view of a television receiver of the type shown in Fig. 2 embodying the present invention whereby to properly center the television raster.

The rings 48 and 50 may be rotated with respect to one another so that the net beam flux center passing transverse to the beam path is just sufficient to overcome the effects of the static D.-C. current through the deflection yoke winding. Arrows 54 and 56 in Fig. 4 illustrate how the rings 48 and 50 may be contra-rotated with respect to one another to adjust the intensity of the net beam centering field produced by the combination. Once the relative positions of the rings 48 and 50 have been determined as producing the desired magnitude of net beam centering field, the rings 48 and 50 may be turned as an assembly within the deflection yoke opening 26 to establish the net beam centering field in alignment with that magnetic axis of the deflection yoke along which the undesirable beam de-centering influence is taking place. By orienting the net beam centering field in opposition with that produced by the direct current flow through the deflection yoke, the television raster illustrated in Fig. 2 may be positioned properly as illustrated in Fig. 5.

The material of which the rings 48 and 50 are made has been described as a barium ferrite compound. Materials commercially available and suited for the manufacture of the rings 48 and 50 are known as "Ceramagnet A," sold by the Stackpole Co., St. Marys, Pa.; "Magnadure," manufactured by Sprague Electric Co., North Adams, Mass.; "Indox II," manufactured by Indiana Steel Products Co., Valparaiso, Ind. and "Ferrimag," manufactured by the Crucible Steel Company of America, Pittsburgh, Pa. The tubular core member 46 may be made of a standard manganese ferrite material well known in the art.

In the particular application of the present invention to color television systems, it is sometimes important to insure that the deflection center of the deflection yoke 14 corresponds with the center of the beam centering influence provided by the rings 48 and 50. In Fig. 1, the deflection center of the deflection coil 14 has been shown by the point 58. The point 58 corresponds to the intersection of the vertical and horizontal deflection windings axes of the deflection yoke. Accordingly, the rings 48 and 50 have been positioned in a substantially symmetrical relation to the deflection center 58 in Fig. 1.

Although the embodiment of the permanently magnetized low permeability rings 48 and 50, shown in Fig. 1, for beam positioning, has been illustrated in connection with an electromagnetic deflection yoke, it is to be understood that the configuration of the rings 48 and 50 surrounded by a magnetic material of greater permeability, such as the tubular member 46 constitutes a useful beam positioning device entirely apart from the proximity of vertical and horizontal deflection coil windings.

Having thus described our invention, what is claimed is:

1. In a beam centering apparatus for a cathode ray beam deflection system which employs an electromagnetic deflection yoke having a substantially cylindrical opening for receiving the neck of a cathode ray tube and a magnetic core of relatively high permeability which at least in part forms a continuous ferrous wall around and along in a uniformly spaced relation to the axis of said cylindrical opening, said opening being so dimensioned to freely accept with substantial clearance the cylindrical neck of a cathode ray beam tube, the combination of: a first and a second cylindrical ring member positioned immediately adjacent one another, each ring member being of ferro-magnetic material having a relatively high magnetic coercivity and retentivity but of low permeability, each ring being permanently magnetized such that opposite extremities of a given ring diameter bear an opposite magnetic pole relation to establish a fixed flux path traversing the cylindrical opening in each ring, the cylindrical opening in each ring further being dimensioned to freely but snugly accept the neck of the cathode ray beam tube while the outer circumferential dimension of each ring is such to freely but snugly fit in the cylindrical opening of said deflection yoke in magnetic coupling relation to the ferrous core material which is in spaced relation to the walls of said cylindrical opening yet to permit said rings to be adjustably contra-rotated with respect to one another to establish a net beam centering field of adjustable intensity within the yoke which traverses a path transverse to the neck of a cathode ray beam tube when placed within said yoke and at least in part the magnetic core of said deflection yoke.

2. In an electromagnetic electron beam deflection system for a cathode ray beam device of the type having a neck surrounding a space within said device along which the electron beam is to travel and be deflected, the combination of: a cathode ray beam deflection yoke having an axis about which is defined a tubular opening for freely accepting the neck of a cathode ray beam device of the type described, the inner surface of said tubular opening being in close spaced relation with a tubular wall of magnetically susceptible material of relatively high permeability and surrounding the yoke; a first and a second magnetized ring member positioned adjacent one another within said yoke opening with each ring having a central opening substantially concentric with the cylindrical opening of said yoke about said axis, the dimensions of said rings being such as to establish magnetic coupling between said wall and the outer periphery of said rings with a value of reluctance between the outer periphery of a given ring and said wall less than the reluctance defined across a diameter of said ring yet permitting sliding and relative contra-rotation of said rings within said yoke opening, the central openings in said rings being so dimensioned as to slidingly but snugly embrace the neck of said cathode ray beam tube and each of said rings being magnetized such that opposite states of magnetic polarity exist on the periphery of each ring at positions defined by the extremities of a given diameter, the material comprising said rings having a magnetic permeability substantially equal to unity.

3. In an electromagnetic deflection system for a television receiver employing a picture reproducing cathode ray beam device having a neck along which is to be positioned an electromagnetic deflection yoke having windings which define a magnetic deflection center which is to be positioned in alignment with a desired deflection center position along said neck, the combination of: an electromagnetic deflection yoke having a cylindrical opening for operatively receiving the neck of cathode ray beam kinescopes and the like, the windings included in said deflection yoke defining a magnetic deflection center; a core member of relatively high magnetic permeability positioned around the windings of said yoke; a first and a second ring member of a material having a permeability substantially equal to unity positioned adjacent one another within said yoke opening and close to said yoke deflection center with each ring having a central opening substantially concentric with the cylindrical yoke opening, the dimensions of said rings being such as to establish a magnetic path between said core and outer periphery of said rings of less reluctance than a path defined across a diameter of one of said rings and permitting sliding and relative contra-rotation within said yoke opening of said rings, said rings further being so dimensioned as to slidingly but snugly embrace the neck of a cathode ray beam device of the type described, each of said rings being made of a magnetizable material having relatively high coercivity and retentivity with a permeability substantially equal to unity and so magnetized as to provide flux paths substantially parallel to a diameter of the ring.

4. A beam centering device for cathode ray beam devices such as kinescopes and the like having cylindrical neck structures surrounding the electron beam within the device comprising in combination: a first and second magnetized ring members positioned immediately adjacent one another, said ring members being of a magnetic material having relatively high coercivity and retentivity but low permeability and so dimensioned as to embrace the neck of cathode ray beam devices of the type described, said rings being each magnetized such that north and south magnetic poles lie at substantially opposite extremities of a given ring diameter; and a tubular member of low magnetic retentivity and relatively high permeability embracing said rings, said tubular member having a central opening of a diameter establishing a flux path between the outer periphery of said rings and said tubular member, said flux path being of a reluctance lower than the reluctance of the flux path reluctance across a diameter of a given ring member; said rings being further so dimensioned that when embraced by said tubular member said rings may be contra-rotated with respect to one another to provide an adjustment of the magnitude of flux caused to pass through the neck of a cathode ray beam device when embraced by said beam centering device.

5. A beam centering device for use in conjunction with a cathode ray beam display apparatus, said display apparatus comprising, a cathode ray beam tube having a neck portion surrounded by an electromagnetic deflection yoke including a plurality of electrical deflection windings, said deflection windings being physically so formed as to define a magnetic deflection center and to provide an axial access opening in said yoke so dimensioned as to freely accept with substantial predetermined clearance the neck of said cathode ray beam tube so as to permit the positioning of said yoke in surrounding relation to said neck with said magnetic deflection center positioned at a predetermined desired point of cathode ray beam deflection influence yet to define a clearance space between portions of said windings and said neck, said beam centering device comprising: adjustable permanent magnet means so dimensioned as to freely enter said clearance space between said windings and said neck, said means comprising a structure of magnetic material having a permeability of the same order of magnitude as that of air so as to minimize distortion of the magnetic field distribution otherwise provided by said deflection windings, said permanent magnet means being so permanently magnetized as to maintain a substantial magnetic potential and resulting flow of magnetic flux along a path transverse to the axis of said deflection yoke access opening, said permanent magnet means being positionable in the immediate vicinity of said magnetic deflection center within said yoke to cause a static displacement of the cathode ray within said cathode ray beam display apparatus.

6. A beam centering device for use in conjunction with a cathode ray beam display apparatus, said display apparatus comprising, a cathode ray beam tube having a neck portion surrounded by an electromagnetic deflection yoke which includes a plurality of electrical deflection windings, said deflection windings being physically so formed as to define a magnetic deflection center and to provide an axial access opening in said yoke so dimensioned as to freely accept with substantially predetermined clearance the neck of said cathode ray beam tube so as to permit positioning of said yoke in surrounding relation to said neck with said magnetic deflection center positioned at a predetermined desired point of cathode ray beam deflection influence yet to define a clearance space between a portion of said windings and said neck, said beam centering device comprising: a first and second permanent magnet member so dimensioned as to freely enter said clearance space between said windings and said neck, each of said members comprising a structure of magnetic material having a permeability of the same order of magnitude as that of air so as to minimize distortion of the flux pattern otherwise produced by said electrical deflection windings when excited with electrical deflection current, each permanent magnet member being so permanently magnetized as to sustain a substantial magnetic potential and resulting flow of magnetic flux along a path transverse to the axis of said deflection yoke access opening, said members being placed immediately next to one another within said clearance space and in the vicinity of said magnetic deflection center defined by said windings to cause vectorial addition of the individual magnetic potentials sustained by each member to yield a resultant beam centering flux flow effective in the vicinity of said deflection center, said members being further so conformed in relation to said yoke as to permit the relative adjustment of each with respect to said yoke and one another along circumferential paths substantially concentric with respect to the axis of said access opening.

7. A beam centering device for use in conjunction with a cathode ray beam display apparatus, said display apparatus comprising a cathode ray beam tube having a neck portion surrounded by an electromagnetic deflection yoke, said deflection yoke comprising a magnetic core member of relatively high permeability which surrounds electrical deflection windings, said deflection windings being physically so formed as to define a magnetic deflection center and to provide an axial access opening in said yoke so dimensioned as to freely accept with substantial predetermined clearance the neck of said cathode ray beam tube so as to permit the positioning of said yoke in surrounding relation to said neck with said magnetic deflection center positioned at a predetermined desired point of cathode ray beam deflection influence yet to define a clearance space between said windings and said neck, said beam centering device comprising: a first and a second permanent magnet member so dimensioned as to freely enter said clearance space between said windings and said neck, each of said members comprising a structure of magnetic material having a permeability greatly lower than that of said core and of the same order of magnitude as that of air and having a relatively high magnetic retentivity greater than that of said core, each member being permanently magnetized to provide a magnetic field along a path transverse to the axis of said deflection yoke access opening, said members being placed immediately next to one another within said clearance space between said neck and a portion of said winding to cause vectorial addition of the individual magnetic fields provided by each member to yield a resultant magnetic beam centering field, said members being further so conformed in relation to said yoke as to permit the relative adjustment of each with respect to said yoke and one another along circumferential paths substantially concentric with respect to the axis of said access opening.

References Cited in the file of this patent

UNITED STATES PATENTS

| | | |
|---|---|---|
| 2,646,522 | Shaw et al. | July 21, 1953 |
| 2,730,642 | Grosjean | Jan. 10, 1956 |

Disclaimer 2,795,717.—*Morris B. Finkelstein*, Collingswood, and *Burton R. Clay*, Woodbury, N.J. CATHODE RAY BEAM CENTERING APPARATUS. Patent dated June 11, 1957. Disclaimer filed Aug. 8, 1962, by the assignee, *Radio Corporation of America.*

Hereby enters this disclaimer to claims 5 and 6 of said patent.

[*Official Gazette September 18, 1962.*]

UNITED STATES PATENT OFFICE

Certificate

Patent No. 2,795,717 Patented June 11, 1957

Morris B. Finkelstein and Burton R. Clay

Application having been made jointly by Morris B. Finkelstein and Burton R. Clay, the inventors named in the patent above identified, and Radio Corporation of America, New York, New York, a corporation of Delaware, the assignee, for the issuance of a certificate under the provisions of Title 35, Section 256 of the United States Code, deleting the name of the said Morris B. Finkelstein from the patent as a joint inventor, and a showing and proof of facts satisfying the requirements of the said section having been submitted, it is this 5th day of March 1963, certified that the name of the said Morris B. Finkelstein is hereby deleted from the said patent as a joint inventor with the said Burton R. Clay.

[SEAL]

EDWIN L. REYNOLDS,
*First Assistant Commissioner of Patents.*

Notice of Adverse Decision in Interference

In Interference No. 89,186 involving Patent No. 2,795,717, B. R. Clay, Cathode ray beam centering apparatus, final judgment adverse to the patentee was rendered Feb. 14, 1961, as to claims 5 and 6.

[*Official Gazette February 4, 1964.*]